United States Patent Office 2,822,404
Patented Feb. 4, 1958

2,822,404

ALDEHYDE CONDENSATION PRODUCTS OF 2-ALKYL-5-METHYLPHENOLS

Joseph C. Ambelang, Akron, Ohio, assignor to The Firestone Tire & Rubber Company, Akron, Ohio, a corporation of Ohio No Drawing. Application September 10, 1952
Serial No. 308,906

12 Claims. (Cl. 260—619)

This invention relates to new condensation derivatives of phenols and aldehydes which are antioxidants for natural and synthetic rubbers and may have other uses. The invention includes the new compounds and their preparation.

The new compounds are crystalline and are produced by reaction of 2 moles of phenol with one mole of aldehyde in the presence of an acid catalyst.

The phenols employed are 2-alkyl-5-methylphenols in which the alkyl group contains 4 to 8 carbon atoms such as, for example:

2-t-butyl-5-methylphenol
2-n-butyl-5-methylphenol
2-iso-amyl-5-methylphenol
2-t-amyl-5-methylphenol
2-n-hexyl-5-methylphenol
2-n-heptyl-5-methylphenol
2-tt-octyl-5-methylphenol, etc.

The aldehydes used in the condensation are the aliphatic aldehydes such as, for example:

Formaldehyde
Acetaldehyde (or paraldehyde)
Propionaldehyde
n-Butyraldehyde
Isobutyraldehyde
Hexaldehyde
n-Heptaldehyde
Nonaldehyde, etc.

A preferred product is the crystalline condensation product of 2-t-butyl-5-methylphenol with acetaldehyde.

In order to produce the crystalline product two moles of phenol are reacted with one mole of aldehyde in the presence of an acid catalyst. Higher proportions of aldehyde tend to the formation of resinous rather than crystalline products. The reaction may be carried out at room temperature or at an elevated temperature. Examples of acid catalysts which may be employed are the hydrohalogen acids, sulfuric acid, zinc chloride, etc.

Although 2-alkyl-5-methylphenols have two reactive positions and three theoretical isomeric reaction products with a given aldehyde, infrared absorption spectra show that the crystalline products are 4,4'-dihydroxydiphenylmethanes. The hydroxyl band of 4,4'-dihydroxydiphenylmethanes has been found to occur at the wave length of 2.74 micra, as illustrated by the condensation product of 2-tert-butyl-6-methylphenol with formaldehyde, whose only possible structure is 4,4'-dihydroxy-3,3'-dimethyl-5,5'-di-tert-butyldiphenylmethane. This wave length is the same as that of the hydroxyl band in 2-tert-butyl-4-methylphenol (2.75 micra).

Since the crystalline condensation products of 2-tert-butyl-5-methylphenol with the aliphatic aldehydes from formaldehyde through nonaldehyde have an infrared absorption band for the hydroxyl from 2.75 to 2.78 micra it follows that the crystalline condensation products of this invention, obtained with the 2-alkyl-5-methylphenols have the hydroxyl groups in the 4 and 4' positions and their structure may be formulated as follows:

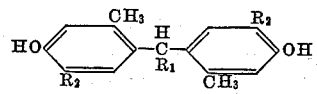

where $R_1$ is from the group consisting of hydrogen and the alkyl radicals from methyl through octyl and $R_2$ is from the group consisting of the alkyl radicals from butyl through octyl.

Dihydroxydiphenylmethanes with hydroxyl groups in the 2,2'-positions have an infrared absorption band at a higher wave length, namely, 2.84–2.88 micra. The longer wave length of absorption bands when the hydroxyl groups are in the 2,2' positions is attributed to intramolecular hydrogen bonding by Sears and Kitchen, J. Am. Chem. Soc. 71, 4110 (1949), and Coggeshall, J. Am. Chem. Soc. 72, 2836 (1950).

The crystalline compounds in which the hydroxyl groups occupy the 4,4' positions, para to the alkylidene bridge, are the preferred compounds for the intended purpose and are the subject of this invention.

The invention is illustrated by the following examples:

*Example I*

Two moles (328 grams) of 2-tert-butyl-5-methylphenol, 0.45 mole (59.4 grams) of paraldehyde, and 60 ml. of hydrochloric acid (sp. gr. 1.19) were stirred under reflux on a steam bath for 4 hours. The reaction mixture was neutralized with sodium carbonate and the product taken up in a benzene-alcohol mixture. After removal of solvent, a crystalline product remained. The yield was 84 percent on the original 2-tert-butyl-5-methylphenol. After recrystallization from benzene the product melted at 201–202° C.

*Example II*

A solution of 26.4 grams (0.12 mole) of 2-tt-octyl-5-methylphenol in 40 ml. of glacial acetic acid was added to 2.6 grams of paraldehyde (0.06 mole of acetaldehyde) and 3.4 ml. of hydrochloric acid (sp. gr. 1.19). After standing 24 hours the mixture was stirred into a large volume of water. The oily product slowly crystallized. The solid was filtered off, dried in air, washed with petroleum ether. The product weighed 15 gms. On recrystallization from a hexane-heptane mixture it melted at 186–186.5° C.

*Example III*

One half mole (82 grams) of 2-tert-butyl-5-methylphenol was stirred with 15 ml. of concentrated hydrochloric acid and while heating on a steam bath. Formaldehyde (0.25 mole) in the form of 7.6 grams of trioxan dissolved in water was added gradually over a 4-hour period. Heptane, 100 ml., was then added and the resulting oil layer removed and washed with sodium carbonate solution. Upon cooling in ice and filtering a nearly colorless crystalline product was obtained. After recrystallizing from a benzene-heptane mixture it melted at 174.5–174.5–175.5° C. (corr.)

*Example IV*

One half mole (82 grams) of 2-tert-butyl-5-methylphenol was mixed with one third mole (19.3 grams) of propionaldehyde and 15 ml. of concentrated hydrochloric acid and heated on a steam bath with stirring until crystals appeared. The product was extracted with heptane. After washing with sodium carbonate solution the crystals were obtained by filtration. After recrystallization from benzene-heptane the product melted at 189–190° C. (corr.)

*Example V*

One half mole (82 grams) of 2-tert-butyl-5-methylphenol was mixed with one third mole (24 grams) of n-butyraldehyde and 15 ml. of concentrated hydrochloric acid. The mixture was stirred and heated on a steam bath for 3 hours when crystals were apparent. The product was worked up as in Example IV. The melting point was 207.5–208° C. (corr.)

*Example VI*

One half mole (82 grams) of 2-tert-butyl-5-methylphenol was mixed with one third mole (33 grams) of 2-ethylbutanal and 15 ml of concentrated hydrochloric acid. The mixture was heated with stirring 4 hours on a steam bath. The product was extracted with hexane and washed with sodium carbonate solution. The liquid was allowed to stand in a crystallizing dish and the crystals filtered out as they formed. A total of 19.9 grams of crystalline product was obtained. After repeated recrystallization from a cyclohexane-heptane mixture the condensation product melted at 195–196.5° C. (corr.)

*Example VII*

One half mole (82 grams) of 2-tert-butyl-5-methylphenol was mixed with one mole of iso-butyraldehyde (24 grams) and 15 ml. of concentrated hydrochloric acid. After heating with stirring for 3 hours on the steam bath the product was worked up in the same manner as the product of Example IV. After recrystallization from a toluene-benzene mixture the product melted at 228.5–229° C.

*Example VIII*

One half mole (82 grams) of 2-tert-butyl-5-methylphenol was mixed with one third mole (38 grams) of n-heptaldehyde and 15 ml. of concentrated hydrochloric acid. The mixture was heated with stirring on a steam bath for five hours. The reaction mixture was worked up in the manner described in Example VI. After recrystallization from heptane the product melted at 159–160° C. (corr.)

*Example IX*

One half mole (82 grams) of 2-tert-butyl-5-methylphenol was mixed with one third mol (48 grams) of 3,5,5-trimethylhexanal and 15 ml. of concentrated hydrochloric acid. The procedure followed was the same as that described in Example VI except that cyclohexane was used as the extraction solvent. After recrystallization from heptane the condensation product melted at 166.5–167.5° C. (corr.)

The products of the foregoing examples were each condensation products of 2 moles of phenol with 1 mole of aldehyde, all being illustrative of the foregoing generic formula. The substituents in the several examples were:

| Example | $R_2$ | $R_1$ |
|---|---|---|
| I | t-butyl | methyl. |
| II | tt-octyl | methyl. |
| III | t-butyl | hydrogen. |
| IV | t-butyl | ethyl. |
| V | t-butyl | n-propyl. |
| VI | t-butyl | 3-pentyl. |
| VII | t-butyl | iso-propyl. |
| VIII | t-butyl | n-hexyl. |
| IX | t-butyl | 2,4,4-trimethylpentyl. |

Different processes may be employed for the manufacture of the condensation products. Generally a slight excess of aldehyde will be used in carrying out the process, the ratio of aldehyde to phenol advantageously being in the range of 3 to 4 moles of aldehyde per 6 moles of phenol.

This application is a continuation-in-part of my application Serial No. 171,761, filed July 1, 1950, which has matured into Patent No. 2,647,102; said application and the present application are both continuations-in-part of my application Serial No. 641,007, filed January 12, 1946, now abandoned.

What I claim is:

1. The crystalline reaction product of 2 moles of 2-alkyl-5-methylphenol and 1 mole of aliphatic aldehyde in the presence of an acid catalyst, the alkyl group containing four to eight carbon atoms.

2. As a new composition of matter the compound of the structure

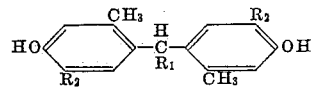

in which $R_1$ is from the group consisting of hydrogen and the alkyl radicals from methyl through octyl, and $R_2$ is from the group consisting of the alkyl radicals from butyl through octyl.

3. As a new composition of matter the compound of claim 2 in which $R_2$ is butyl.

4. As a new composition of matter the compound of claim 2 in which $R_1$ is methyl.

5. The method of producing condensation derivatives of aldehydes and phenols which comprises reacting substantially one mole of aliphatic aldehyde with two moles of 2-alkyl-5-methylphenol in the presence of an acid catalyst, the alkyl group containing four to eight carbon atoms.

6. The process of claim 5 in which the acid catalyst is aqueous hydrochloric acid.

7. The process of claim 5 in which the alkyl group is butyl.

8. The method of producing a condensation product which comprises reacting substantially one mole of acetaldehyde with two moles of 2-butyl-5-methylphenol in the presence of aqueous hydrochloric acid.

9. Method of producing a crystalline condensation product, which comprises heating together 3 to 4 moles of an aliphatic aldehyde with 6 moles of a 2-alkyl-5-methylphenol in the presence of an acid catalyst, the alkyl group containing four to eight carbon atoms.

10. As a new composition of matter a compound of the structure

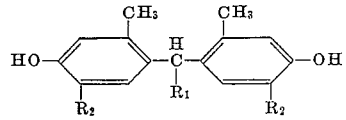

in which $R_1$ is selected from the group consisting of hydrogen and alkyl radicals containing from 1 to 8 carbon atoms, and $R_2$ is selected from the group consisting of alkyl radicals containing from 4 to 8 carbon atoms.

11. As a new composition of matter a compound of the structure

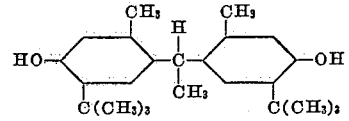

12. The method of making definite chemical compounds having two hydroxy aryl radicals linked to a central carbon atom which comprises eliminating water of condensation by heating in the presence of an acidic condensation catalyst an aldehyde selected from the group consisting of $R_1CHO$, where $R_1$ is selected from the group consisting of hydrogen and alkyl radicals containing from 1 to 8 carbon atoms and an aldehyde of the structure $(CH_3CHO)_3$, and a 6-alkyl-m-cresol,

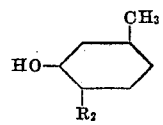

wherein $R_2$ is selected from the group consisting of alkyl radicals containing from 4 to 8 carbon atoms and terminating the reaction before resinous polymers are produced.

(References on following page)

References Cited in the file of this patent

UNITED STATES PATENTS

| | | |
|---|---|---|
| 2,058,797 | Honel | Oct. 27, 1936 |
| 2,515,907 | Stevens et al. | July 18, 1950 |

FOREIGN PATENTS

| | | |
|---|---|---|
| 480,524 | Canada | Jan. 22, 1952 |

OTHER REFERENCES

Florestano: J. Pharmacol. Explt. Therap., vol. 96 (1949), pages 238–249 (12 pages).